May 3, 1966  J. Z. DE LOREAN  3,249,172
AUTOMOTIVE VEHICLE HOOD, INTAKE SILENCER, AND FILTER
Filed May 29, 1963
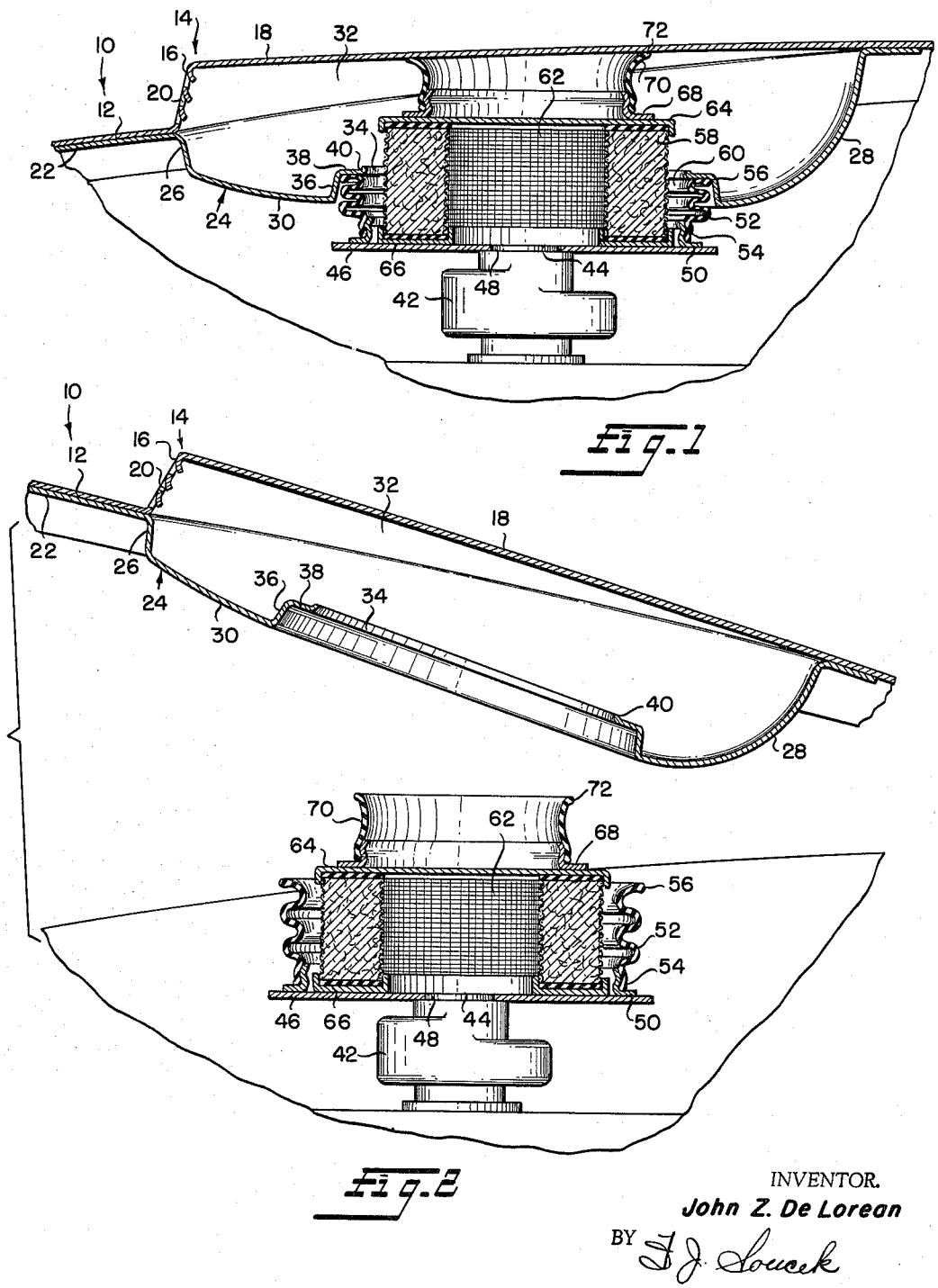
INVENTOR.
John Z. De Lorean
BY
Attorney

United States Patent Office 3,249,172
Patented May 3, 1966

---

3,249,172
AUTOMOTIVE VEHICLE HOOD, INTAKE SILENCER, AND FILTER
John Z. De Lorean, Birmingham, Mich., assignor to General Motors Corporation, Detroit, Mich., a corporation of Delaware
Filed May 29, 1963, Ser. No. 284,166
2 Claims. (Cl. 180—69)

This invention relates generally to a silencing and filtering device for the air induction system of an automotive vehicle and more particularly to such a device which is associated with an engine compartment hood swingably mounted on an automative vehicle.

Air filters are standard equipment for automotive engines. They serve to remove harmful foreign particles from the air taken into the carburetor and to silence to some extent the noises associated with the air induction system. It is well known in the art to provide a resonator chamber to further silence the noises associated with the air induction system. It has been found that, due to size requirements of the resonator chamber and the amount of engine compartment space available, it is desirable to mount the resonator chamber on the underside of the engine compartment hood. It is also well known to provide an air inlet open to the atmosphere for the induction system, thereby making a cooler and cleaner air supply available.

Heretofore, attempts have been made to incorporate one or more of the above features into an automotive vehicle air induction system; however, no system has yet been devised which incorporates all of the above features. Accordingly, it is an object of this invention to provide an improved air induction system which includes an air filter, a resonator chamber and an atmospheric air inlet.

Another object of this invention is to provide an air induction system which affords a maximum cleaning and silencing effect.

Another object of this invention is to provide an air induction system in which an air intake, filter and resonator have been incorporated in such a manner as to afford an adequate supply of clean air and yet silence the noises associated therewith to the maximum extent.

Still, another object is to provide an air cleaner element which is easily accessible when an engine compartment hood is raised.

A further object is to eliminate the need for a separate housing structure for an air cleaner.

With these and other objects in view, the invention comprises the arrangements, constructions, and combinations of the various elements described in the specification, claimed in the claims and illustrated in the accompanying drawings, in which:

FIGURE 1 is a side elevation cross section of a portion of an automotive vehicle engine compartment incorporating the present invention and showing the relative position of the resonator chamber, air filter and carburetor when the engine compartment hood is in a lowered position.

FIGURE 2 is a side elevation cross section of a portion of an automotive vehicle engine compartment incorporating the present invention and showing the relative position of the resonator chamber, air filter and carburetor when the engine compartment hood is in a raised position.

Referring to the drawings, the air induction system is associated with an automotive vehicle hood indicated generally at 10 which is pivotally mounted to an automotive vehicle in a conventional manner (not shown). The hood 10 comprises an outer panel 12 into which a step 14 comprising a front wall 16 and top wall 18 has been formed. The front wall 16 of step 14 is provided with louvers or slots 20 which form an air inlet. Secured to the outer panel 12 is a hood inner panel 22 which includes a depressed or disk-like portion 24. The depressed portion 24 comprises downwardly extending front and rear walls 26 and 28 and a substantially flat bottom wall 30. The downwardly extending front wall 26 of the inner panel 22 mates with the front wall 16 of the outer panel while the rear wall 28 of the inner panel 22 extends to the top wall 18 of the outer panel 12 to form a resonator chamber 32. Bottom wall 30 is apertured at 34 to provide an outlet for the resonator chamber 32. The area immediately adjacent the outlet 34 has been formed into an annular upwardly and slightly inwardly extending ring portion 36 and a radially inwardly extending annular flange 38. The inner circumference of the annular flange 38 terminates with a slight upwardly bent fillet-like ledge 40. Within the engine compartment is a carburetor 42 having an inlet 44 which is substantially coaxial with but spaced below the outlet 34 when the hood 10 is in the lowered position, as shown in FIGURE 1. Secured to the upper surface of carburetor 42 is a support member 46 having an aperture 48 therein which coincides with the carburetor inlet 44. Fastened to the outer periphery of the support member 46 is a mounting ring 50 which frictionally or otherwise suitably engages the inner diameter of lower end 54 of a flexible tubular member 52. The flexible tubular member 52 is axially and slightly radially expandable so that a beaded free end 56 will form a fluid tight seal with the lower surface of the hood inner panel 22 at the juncture of ring portion 36 and annular flange 38 when hood 10 is in a lowered position.

An air filter element 58 is disposed within the flexible tubular member 52 and is supported by support member 46 in a manner such that an annular space 60 is provided between flexible tubular member 52 and the lower portion of the filter element 58 thereby exposing the total lateral surface of the filter element 58 to the flow of air. The upper portion of the filter element 58 extends into the resonator chamber 32. A central chamber 62 in the air filter element 58 provides a fluid conduit for receiving air flowing radially through the filter element 58 and delivering it to the carburetor inlet 44. The filter element 58 is shown as having upper and lower shells 64 and 66. The lower shell 66 comprises an annular sheet metal body having an inner and outer circumferential flange. The upper shell 64 comprises a circular sheet metal body having an outer circumferential flange. The upper shell 64 thus acts as a cover for chamber 62 in filter element 58 thereby preventing foreign particles from falling into carburetor 42 when hood 10 is in a raised position. Secured to the upper surface of the upper protective shell 64 is a second mounting ring 68 which frictionally or otherwise suitably engages the inner diameter of a second flexible tubular member 70 at its lower end. The upper end of the second flexible tubular member 70 terminates in a circumferential edge 72 which engages the lower surface of the outer hood panel 12. The second flexible tubular member 70 is slightly axially expandable so that compressive forces are set up when hood 10 is in a lowered position. These compressive forces act to effect a seal between the upper shell 64 and filter element 58 and also to prevent the filter element 58 from shifting when the vehicle is in motion.

From the foregoing description, it can be seen that during normal operation, atmospheric air enters the louvered inlet 20 of the resonator chamber 32 and then passes through the air filter element 58 and into carburetor 42. If the need for inspection or replacement of the filter element 58 should arise, it is apparent from FIGURE 2 that it is only necessary to raise hood 10 and the filter element is readily accessible for visual inspection or replacement.

Thus, in accordance with the objects of this invention, an adequate supply of relatively clean atmospheric air is taken in through the louvered inlet 20 into the resonator chamber where silencing of the moving air stream is effected. The air then moves through the filter element 58 where a minimum amount of cleaning is required, since the air originated from the relatively clean atmosphere rather than the engine compartment. The air is finally delivered to the carburetor. In addition, the above has been accomplished by a new combiniton which is simple in construction and in which parts have been eliminated. For instance, the resonator chamber 32 which is formed as an integral part of hood 10 serves not only as a silencer but also as the housing which is usually associated with an air filter. The precise location of the various elements has also eliminated the need for extensive duct work.

It should be understood, of course, that the foregoing disclosure relates to only a preferred embodiment of the invention and that it is intended to cover all the changes and modifications of the example of the invention herein chosen for the purposes of the disclosure which do not constitute departures from the spirit and scope of the invention.

I claim:

1. In an automotive vehicle having a pivotally mounted hood, a hood outer panel, a step in said outer panel, an air inlet in said step, an inner panel secured to said outer panel, a depressed portion in said inner panel which mates with said step in said outer panel to form a resonator chamber therebetween, a substantially flat bottom wall in said depressed portion, said bottom wall being deformed to provide an integral upwardly extending ring and an inwardly extending flange terminating in an outlet, a carburetor having an inlet substantially coaxial with and spaced below said outlet, a support member having an aperture therein adjacent said carburetor inlet mounted on the upper surface of said carburetor and axially spaced from said outlet, a first flexible tubular member having one end mounted on said support member radially outwardly from said aperture and an opposite end normally sealingly engaging said inwardly extending flange at the juncture of said ring and flange, an air cleaner element mounted on said support member radially inwardly from said first flexible tubular member and extending into said resonator chamber, a cover member on said air cleaner closing the upper surface thereof, and a second flexible tubular member having one end mounted on the upper surface of said cover member and an opposite end normally compressively engaging said outer panel to urge said air cleaner element into firm engagement with said support member, whereby an air path is provided from said air inlet to said carburetor inlet through said resonator chamber and said filter element when said hood is in a closed position, said filter element being exposed for easy access when said hood is in an open position.

2. In an automotive vehicle having a pivotally mounted hood, a hood outer panel, a step in said outer panel, a louvered inlet in said step, an inner panel secured to said outer panel, a depressed portion in said inner panel which mates with said step in said outer panel to form a resonator chamber therebetween, a substantially flat bottom wall in said depression, said bottom wall being deformed to provide an integral upwardly extending ring and an inwardly extending flange terminating in an outlet, a carburetor having an inlet substantially coaxial with and spaced below said outlet, a support member having an aperture aligned with said carburetor inlet mounted on the upper surface of said carburetor and axially spaced from said outlet, a first flexible tubular member having one end mounted on said support member radially outwardly from said aperture and an opposite end normally sealingly engaging said inwardly extending flange at the junction of said ring and flange, an annular air cleaner element mounted on said support member radially between said first flexible tubular member and said aperture and extending into said resonator chamber, a cover member mounted on said annular air cleaner element and closing the upper surface thereof, and a second flexible tubular member having one end mounted on the upper surface of said cover member and an opposite end normally compressively engaging said outer panel to urge said air cleaner element into firm engagement with said support member, whereby an air path is provided from said louvered air inlet to said carburetor inlet through said resonator chamber and said filter element when said hood is in a closed position, said filter element being exposed for easy access when said hood is in an open position.

References Cited by the Examiner

UNITED STATES PATENTS

| | | | |
|---|---|---|---|
| 1,846,283 | 2/1932 | Summers. | |
| 1,855,038 | 4/1932 | Walker. | |
| 1,863,015 | 6/1932 | Kamrath. | |
| 1,876,679 | 9/1932 | Holmes | 55—385 X |
| 2,195,565 | 4/1940 | Fricke | 55—502 |
| 2,197,503 | 4/1940 | Martin. | |
| 2,701,024 | 2/1955 | Thomas. | |
| 2,808,893 | 10/1957 | Dorman et al. | 180—54 |
| 2,834,419 | 5/1958 | Sebok | 180—69 X |
| 2,881,860 | 4/1959 | Ternes | 55—276 |
| 2,897,916 | 8/1959 | Probst | 55—276 X |
| 2,952,327 | 9/1960 | Farr. | |
| 3,002,870 | 10/1961 | Belgarde et al. | 156—292 X |
| 3,151,695 | 10/1964 | Mintz | 180—54 |

ROBERT F. BURNETT, *Primary Examiner.*

HARRY B. THORNTON, *Examiner.*